Jan. 13, 1970  D. L. PLACKE ET AL  3,489,341
AUTOMATIC CYCLE CONTROL MECHANISM FOR BUSINESS MACHINES
Filed March 13, 1968  5 Sheets-Sheet 1

INVENTORS
DALE L. PLACKE
DAVID C. WERNER &
MARVIN D. FROST

BY
THEIR ATTORNEYS

Jan. 13, 1970    D. L. PLACKE ET AL    3,489,341
AUTOMATIC CYCLE CONTROL MECHANISM FOR BUSINESS MACHINES
Filed March 13, 1968    5 Sheets-Sheet 2

INVENTORS
DALE L. PLACKE
DAVID C. WERNER &
MARVIN D. FROST
BY
THEIR ATTORNEYS

Jan. 13, 1970     D. L. PLACKE ET AL     3,489,341
AUTOMATIC CYCLE CONTROL MECHANISM FOR BUSINESS MACHINES
Filed March 13, 1968     5 Sheets-Sheet 3

INVENTORS
DALE L. PLACKE
DAVID C. WERNER &
MARVIN D. FROST
BY
THEIR ATTORNEYS

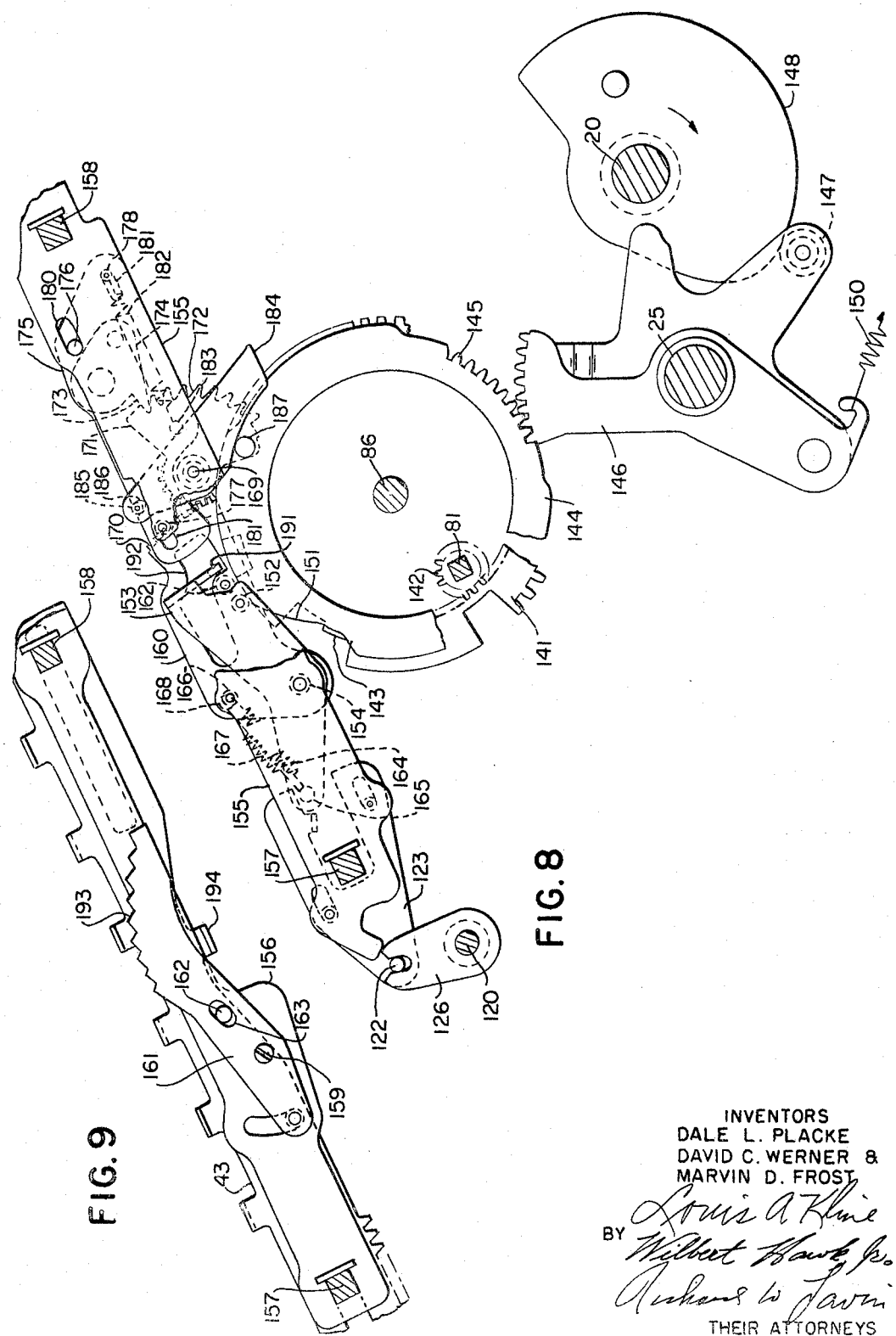

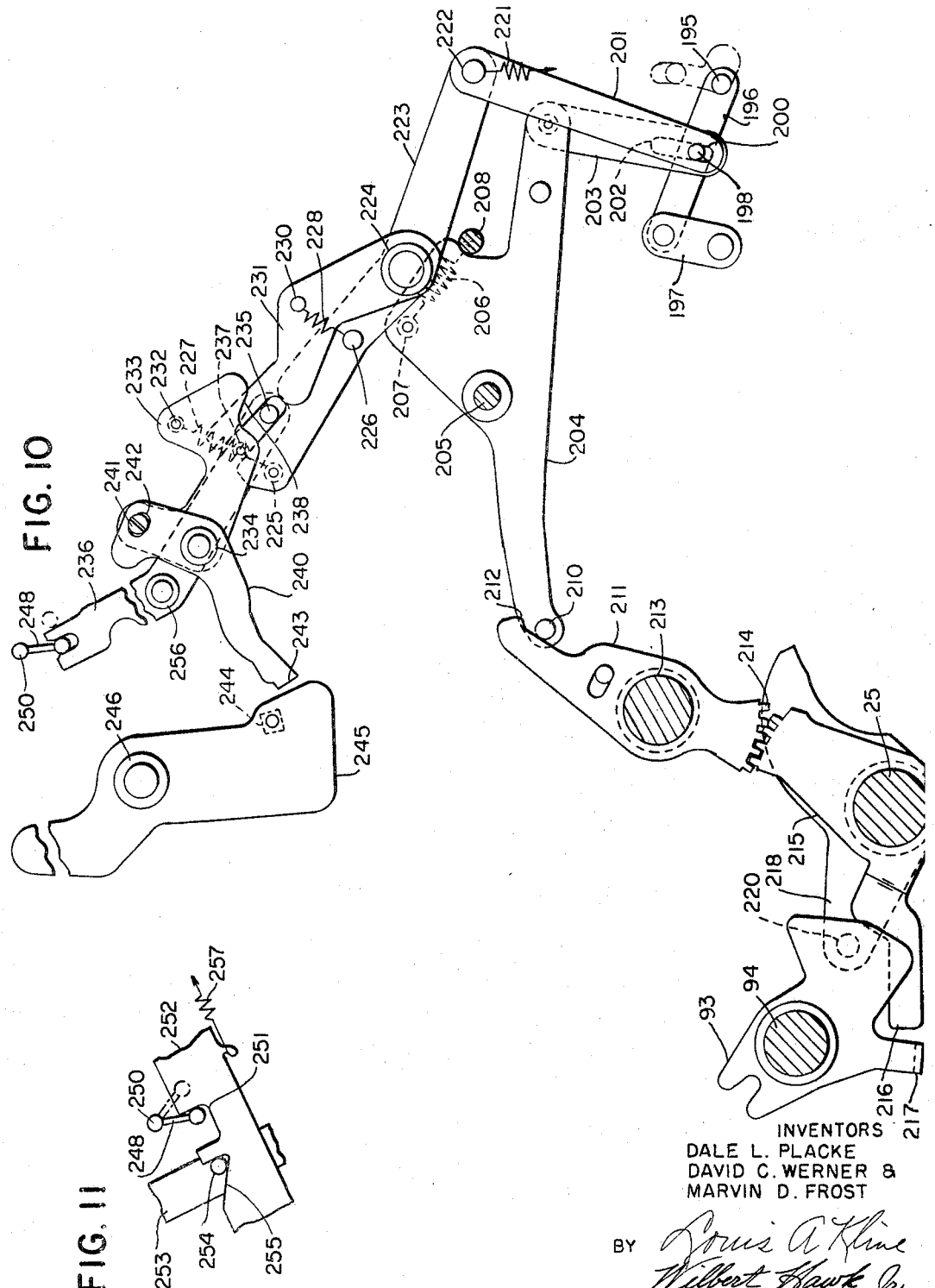

United States Patent Office 3,489,341
Patented Jan. 13, 1970

3,489,341
AUTOMATIC CYCLE CONTROL MECHANISM
FOR BUSINESS MACHINES
Dale L. Placke, David C. Werner, and Marvin D. Frost, Dayton, Ohio, assignors to The National Cash Register Company, Dayton, Ohio, a corporation of Maryland
Filed Mar. 13, 1968, Ser. No. 712,711
Int. Cl. G06c 7/00
U.S. Cl. 235—60                                   12 Claims

ABSTRACT OF THE DISCLOSURE

A mechanism in a business-orientated machine selectively positioned by a key-representing rack member during one machine operation for positioning the rack member in a predetermined key-representing position during a succeeding machine operation. A machine trip mechanism is controlled by the selectively-positioned mechanism for operating the business machine through a predetermined number of successive machine operations.

CROSS-REFERENCE TO RELATED APPLICATIONS

Programmable Function Control Mechanism for Business Machines, United States patent application Ser. No. 618,598, filed Feb. 27, 1967, by Louis E. Zurbuchen and Freeland R. Goldammer, now U.S. Patent No. 3,431,401.

Cycle Control Mechanism for Business Machines, United States patent application, Ser. No. 601,147, filed Dec. 12, 1966, by Dale L. Placke and Kenneth C. Flint, now U.S. Patent No. 3,384,211.

BACKGROUND OF THE INVENTION

In the development of cash registers and accounting machines wherein operations of the machine require the depression of certain control keys in a predetermined sequence, key interlocks which lock out all control keys except the one that is to be depressed have been used to eliminate any misoperation of the keys. Other developments have been directed towards signal lights, located in the key tips, which are lit to indicate the control key to be depressed. In both cases, the operator is still left with the choice of depressing or not depressing the designated key. In addition, both systems require a structure which limits the number of machine operations which may be programmed. Once the machine has been programmed for certain machine operations, changing the programs requires a complete rebuilding of the machine.

It is therefore an object of the invention to provide a mechanism which will automatically cycle a cash register or accounting machine through a plurality of predetermined machine operations without the necessity of depressing any control keys.

It is a further object of this invention to provide an automatic cycle mechanism which is simple in construction and capable of generating any number of consecutive machine operations.

It is another object of this invention to provide a mechanism for controlling the machine to allow an amount entry operation to occur prior to the automatic cycle operation.

SUMMARY OF THE INVENTION

A mechanism for stopping the primary rack member of a cash register or accounting machine in a key-representing position, the mechanism being controlled by the position of a primary rack member during a previous machine operation. The mechanism includes a plurality of control discs each containing a number of control surfaces, each control surface being differentially set according to the position of a primary rack member; means for sensing the control surfaces; and means under the control of the sensing means for positioning the primary rack members. The control discs also control the cycle trip mechanism of the machine, thereby conditioning the machine for continuous operation.

BRIEF DESCRIPTION OF THE DRAWINGS

FIGURE 8 is a partial detailed side view of the mechanism for automatically positioning the transaction rack members of the machine.

FIGURE 9 is a partial detailed side view of the automatic rack stop member and its associated primary transaction rack member.

FIGURE 10 is a detailed side view of the cycle control mechanism for transferring the machine from a short cycle operation to a long cycle operation.

FIGURE 11 is a partial detailed side view of the engagement of the amount control detent by its associated amount key.

DESCRIPTION OF THE PREFERRED EMBODIMENT

As described above, the invention of the present disclosure is directed to a cash register or accounting machine of the type disclosed in United States patent application Ser. No. 618,598, filed Feb. 27, 1967, by Louis E. Zurbuchen and Freeland R. Goldammer, and in United States patent application Ser. No. 601,147, filed Dec. 12, 1966, by Dale L. Placke and Kenneth C. Flint. The keyboard of the machine in which the present invention is utilized is similar in construction and operation to the keyboard disclosed in United States Patent No. 2,616,623, issued Nov. 4, 1952, on the application of Mayo A. Goodbar et al., and in United States Patent No. 1,865,147, issued to Bernis M. Shipley on June 28, 1932. As shown in those patents, and as is well known in this art, depression of a key in a transaction row moves a number of control detent members to an operating position in addition to stopping the primary rack member at a position which represents the transaction key depressed. A secondary rack member is then positioned according to the position of the primary rack member. As disclosed in the above-cited applications and patents, the positioning of the secondary rack member controls the operation of indicating mechanism and printing mechanism, and selects a line of totalizer elements to be brought into engagement with further differential rack members mounted in the amount key banks, so that the setting of the amount entry differential rack members (primary and secondary) will add into or subtract from the engaged totalizers the particular digit amount represented by the key selected and depressed in the amount bank. Thus the depression of a transaction key controls the operation of various components of the business machine through the movement of various control detents and the positioning of the primary and secondary transaction rack members.

Figure 1:
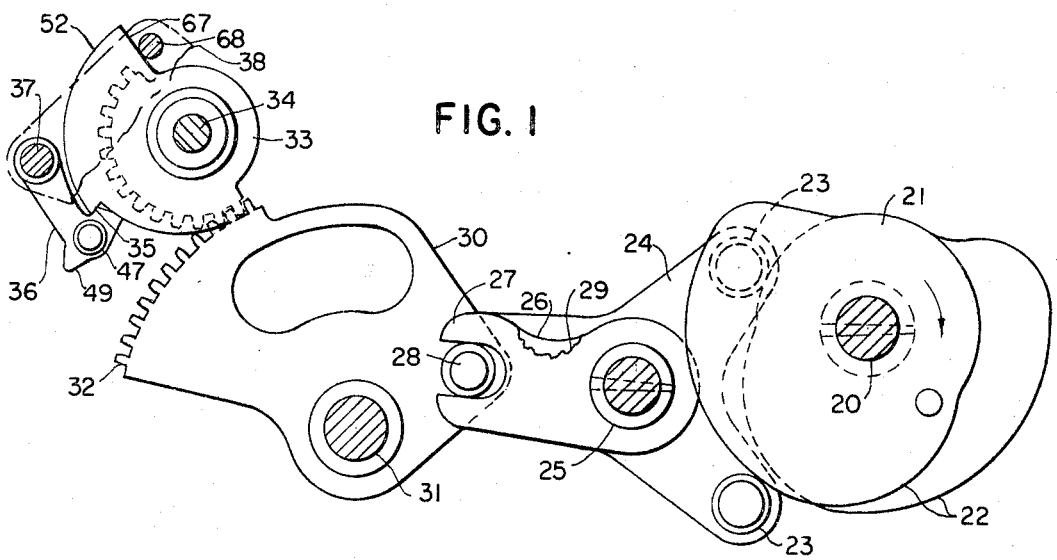
FIGURE 1 is a partial detailed side view of the transaction differential actuating mechanism showing the cam drive and the latch mechanism.

Referring now to FIGURES 1 to 4 inclusive, there is shown a differential actuating mechanism utilized in the present machine for positioning the primary and secondary rack members commensurate with the transaction key depressed in each of the transaction rows. There are three rows of transaction keys. Mounted on the main cam drive shaft 20 is a cam member 21, whose cam surfaces 22 are engaged by a pair of rollers 23 mounted on a cam follower arm 24. The cam follower arm 24 is pinned to a cam arm shaft 25. The cam arm shaft 25 is rocked first counter-clockwise and then clockwise during each machine operation. Also pinned to the cam arm shaft 25 are two transaction differential drive arms 26, 29, both of which are shown in FIGURE 1. Both drive arms 26, 29 and the cam follower arm 24 have a yoke portion 27, which engages a roll 28 mounted on an associated drive segment 30, which in turn is rotatably mounted on a shaft 31 located within the machine framework. The cam follower arm 24 engages the drive segment 30 of the third transaction bank, while the two drive arms 26, 29 engage the drive segment of the first and second transaction banks of keys.

Upon clockwise rotation of the cam shaft 20, the cam follower arm 24 is rocked first counter-clockwise. The shaft 25 is rotatably supported within the machine framework. Since the arm 24 is pinned to the shaft 25, the shaft is rocked counter-clockwise upon the rocking of the cam 21, resulting in the clockwise movement of the drive arms 26, 29. Since each of the arms 26, 29 and the cam arm 24 engage a drive segment 30, the segments in each of the transaction banks are rocked clockwise about the shaft 31 by the rotation of the shaft 25.

The movement of the drive segment 30 is transmitted by means of gear teeth 32 to a latch drive gear 33, which is rotatably mounted on a shaft 34 secured to a support plate (not shown) in the machine. This movement of the drive segment rocks the latch drive gear 33 counter-clockwise, thereby allowing a step portion 35, located on the peripheral edge of the drive gear 33, to engage a latch member 36 rotatably mounted on a stud 37 secured to a latch carry arm 38, which in turn is rotatably mounted on the shaft 34. Both the latch member 36 and the arm 38 are rocked counter-clockwise by the rotation of the drive gear 33.

Figure 2:
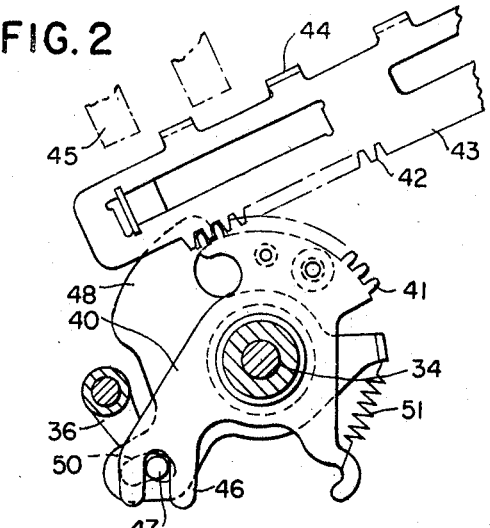
FIGURE 2 is a partial detailed side view of the transaction differential actuating mechanism showing the engagement of the transaction primary rack mechanism by the primary gear member.

As shown in FIGURE 2, rotatably mounted on the shaft 34 is a primary gear member 40 having a number of gear teeth 41, which engage the gear teeth 42 located on the bottom portion of a primary rack member 43 mounted for rectilinear movement in the machine. As disclosed in the previously cited Goodbar et al. United States patent, and as is well known in the art, the primary rack member contains a plurality of bent-over flange members 44, which engage an associated stem 45 of a transaction key when the transaction key is depressed. Thus the primary rack member can be positioned commensurate with the transaction key depressed.

Figure 5:
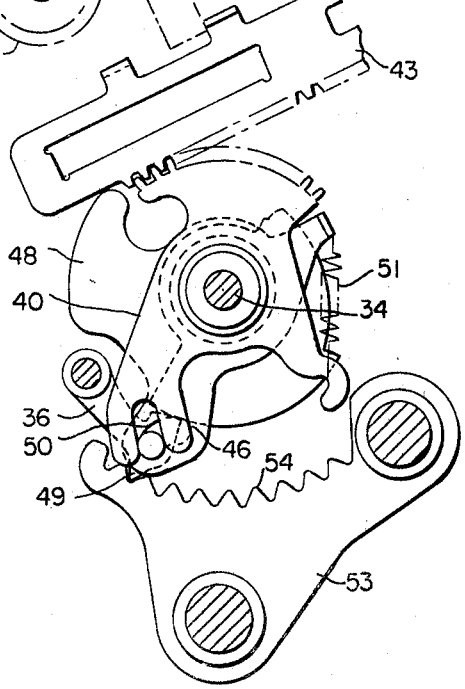
FIGURE 5 is a partial detailed side view of the transaction differential actuating mechanism showing the index plate and the latch mechanism.

The lower portion of the primary gear member 40 consists of a yoke portion 46, which is yoked over a stud 47 mounted on the latch member 36. Rotatably mounted on the shaft 34, adjacent the primary gear 40, is a balance plate 48, which contains a raceway 50, within which the stud 47 is located. A spring 51 interconnects the plate 48 and the primary gear member 40. Upon the counter-clockwise movement of the latch member 36, the plate 48 and, by the action of the spring 51, the primary gear member 40 is rotated counter-clockwise. This movement drives the primary rack member to the left, as viewed in FIGURE 2, until a flange member 44 on the primary rack member engages the stem 45 of the depressed transaction key. This condition is shown in FIGURE 5. Thus the primary rack member is positioned commensurate with the transaction key depressed.

Stopping of the primary rack by a transaction key also stops the movement of the primary gear member 40. As the latch member 36 continues its counter-clockwise movement, the balance plate 48 continues for a short distance until the spring 51 exerts a stopping movement on the plate. At this time, the latch member 36 is rocked clockwise about its stud 37 by the action of the stud 47, which is cammed to the left portion of the raceway 50 (FIGURE 2) by the yoke portion 46 of the primary gear member 40 when the gear member is stopped. This action disengages, or "breaks out," the latch member from the latch drive gear 33, which then continues its counter-clockwise movement. The latch drive gear 33 has a peripheral locking surface 52 (FIGURE 1), which engages the latch member 36 and locks it in its "broken-out" position.

Mounted below the latch member 36 is an index plate 53 (FIGURE 5) containing a plurality of notches 54. When the stud 47 of the latch member 36 is cammed to the bottom of the raceway 50, the heel portion 49 (FIGURES 1 and 3) of the latch member is positioned within one of the notches 54 of the index plate 53. This action will, in effect, lock the latch member in its "broken-out" position.

The transaction differential drive arms 26 and 29 and the cam arm 24 (FIGURE 1), which drive the drive segments 30, also drive a squeeze arm 55 (FIGURE 3) clockwise as a result of the rocking of the arm 24. One end of the squeeze arm contains a roll 56 on a stud which engages the lower portion of a beam member 57 upon the rocking of the squeeze arm 55.

The beam member 57 is rotatably mounted on a stud 58 located on a secondary segment 60 secured to the shaft 34. The secondary segment 60 has a number of gear teeth 61, which engage the gear teeth 62 located on the bottom portion of a secondary rack member 63. The beam member 57 has mounted thereon a stud 64, which is located in a yoke portion 65 of the latch carry arm 38. After the latch member 36 has "broken out" from engagement with the latch drive gear 33 upon the stopping of the primary rack member 43, as described previously, the latch member 36 and the latch carry arm 38, on which it is mounted, assume a fixed position. This causes the stud 64 on the beam member 57 to be its point of center of rotation. At this time, the roll 56 of the squeeze arm 55 engages the beam member 57, swinging the beam member about the stud 64, which at this time is at the upper end of the yoke portion 65 of the carry arm 38. Continued clockwise rotation of the squeeze arm 55 results in the beam member's being squeezed between the roll 56 on the squeeze arm and a hub member 66 mounted on the shaft 34.

Figure 3:
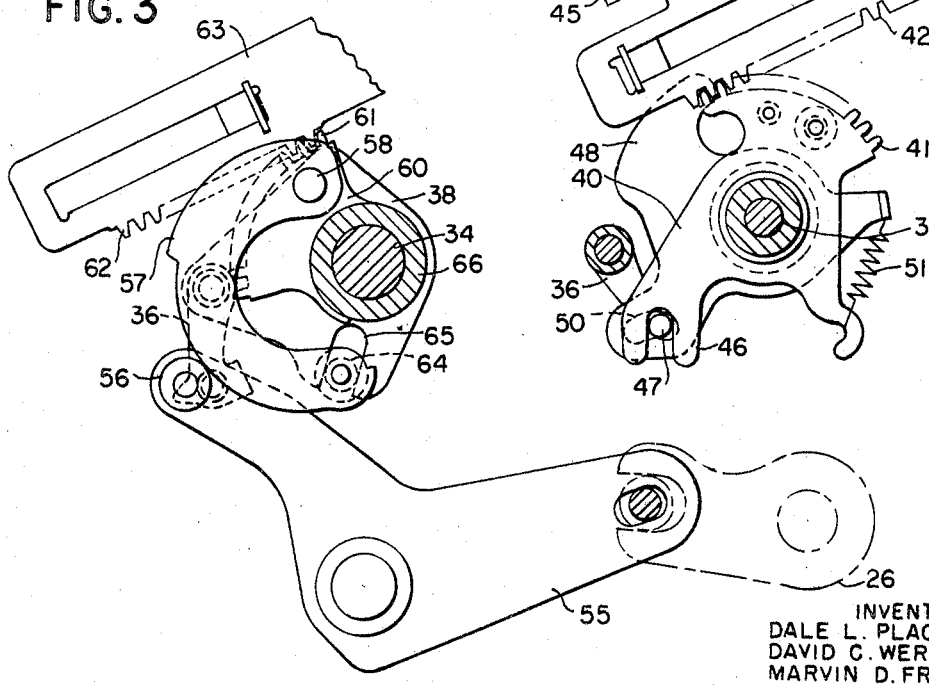
FIGURE 3 is a partial detailed side view of the transaction differential actuating mechanism showing the mechanism for positioning the secondary rack member.

The clockwise rotation of the beam member 57 during this operation also rocks the secondary segment 60 clockwise, which drives the secondary rack 63 to the right, as viewed in FIGURE 3. Once the point of squeeze has been reached by the beam member, the secondary rack 63 will have been positioned commensurate with the transaction key depressed. This is due to the fact that the carry arm 38 represents the setting of the primary rack member 43. This setting will control the point of squeeze of the beam member 57 on the hub member 66. As disclosed fully in the previously cited Goodbar et al. United States patent, movement of the secondary rack member controls the printing and indicating functions of the machine.

As the cam 21 continues its counter-clockwise rotation, the arms 24, 26 and 29 are rocked clockwise. This movement is transmitted to the drive segment 30 and the drive gear 33. As the drive gear is rocked clockwise, a contact surface 67 (FIGURE 1) of the drive gear engages a stud 68 mounted on the latch carry arm 38, thereby rotating the carry arm clockwise. At the same time, the locking surface 52 of the drive gear moves away from the latch member 36, thereby allowing the latch member to be restored to the step portion 35 of the drive gear by the action of the spring 51 (FIGURE 2), which brings the balance plate 48 and the gear member 40 together. This results in the stud 47 of the latch member being cammed to the right, as viewed in FIGURE 2, by the action of the yoke portion 46 of the gear member 40 in the raceway 50 of the plate 48 on the stud.

As the latch drive gear 33 rotates clockwise, the carry arm 38 and the primary gear member 40 also are rotated clockwise, thereby returning the primary rack member 43 to its home position. Rocking of the arms 24, 26, and 29 also results in the counter-clockwise rocking of the squeeze arm 55 (FIGURE 3), thereby withdrawing the roll 56 from engagement with the beam member 57. During this time, a liner mechanism (not shown), similar to the liner 778 disclosed in FIGURE 37 of the previously cited Goodbar et al. United States patent, locks the secondary rack 63 in its adjusted position. This action also locks the secondary segment 60 in place. As the latch carry arm 38 moves clockwise towards its home position, the yoke portion 65 of the arm rocks the beam member 57 clockwise about the stud 58, which is held stationary by the secondary segments 60. As the beam moves, its center curved portion moves away from the hub 66, thereby opening a gap. The amount of gap is proportional to the secondary rack's position above its first keyboard position. During the next machine operation, the secondary rack will be released to move directly to the next adjusted position of the primary rack. Thus it can be seen from this construction that the secondary rack of each transaction bank is moved to a position commensurate with the transaction key depressed in that respective bank.

Figure 4:
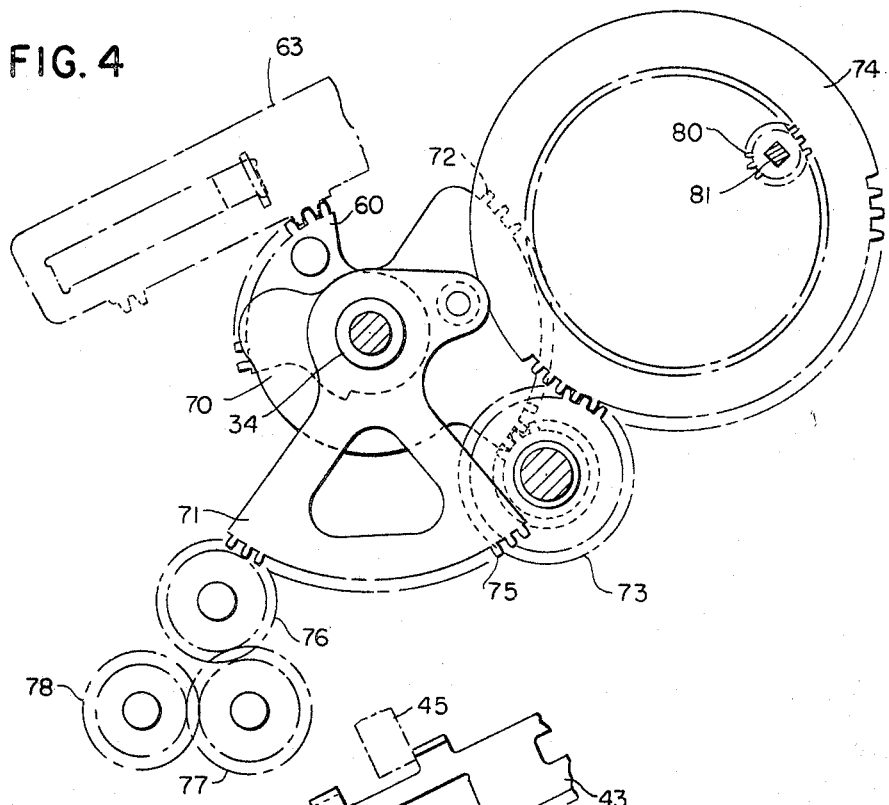
FIGURE 4 is a partial detailed side view of the gear mechanism for transmitting the movement of the secondary transaction rack member to a transaction segment.

Referring now to FIGURE 4, there is shown the secondary transaction rack member 63 engaged by the secondary segment, which is secured to the shaft 34. Also secured to the shaft 34 are a transmission drive segment 70 and a sequence drive segment 71, each of which is rotated a distance commensurate with the transaction key depressed due to the rotation of the secondary segment 60 in the manner described above. The drive segment 70, through gear teeth 72, rotates an idler gear 73, which in turn engages and rotates a transaction segment 74. The sequence drive segment 71, through gear teeth 75, engages and rotates a gear 76, which in turn rotates gears 77 and 78. The gears 76, 77, and 78 are utilized to control counter wheels in the machine.

Figure 6:
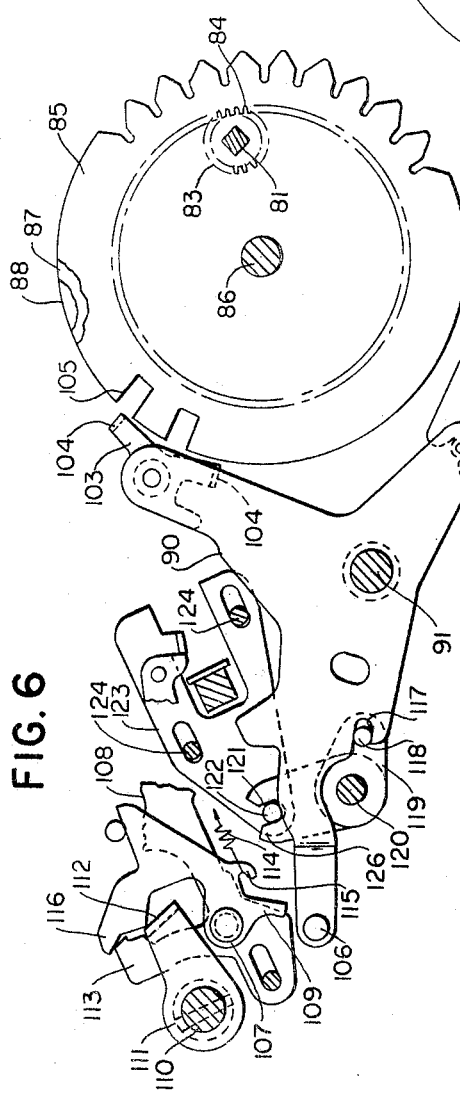
FIGURE 6 is a partial detailed side view of the mechanism for controlling the operation of the key lock line.

The transaction segment 74 contains a number of internal gear pinions 80, one of which is shown in FIGURE 4. The pinion is mounted on a square shaft 81 and engages the internal teeth 82 of the transaction segment 74. Rotation of the transaction segments 74 rotates the pinions 80 and the square shaft 81. The shaft 81 extends the width of the machine and engages a second pinion 83 (FIGURE 6). The pinion 83 engages the internal teeth 84 of a selecting plate 85, thereby positioning the selecting plate according to the movement given to the square shaft 81 by the segment 74. It is seen from this construction that the selecting plate 85 is positioned according to the positioning of the transaction rack 63 (FIGURE 4) through the segment 74. Reference should be made to the previously cited Goodbar et al. United States patent, which fully discloses the structure and the operation of the pinions 80 and the square shaft 81 in controlling the various operations of the machine.

As shown in FIGURE 6, in addition to the selecting plate 85, two other selecting plates 87 and 88, are mounted on the shaft 86. There is one selecting plate for each transaction bank of keys, and each plate is controlled in the manner described above. Thus, during the machine operation, each of the selecting plates is positioned commensurate with the transaction key that is depressed in the transaction bank by which the selecting plate is controlled.

Associated with each of the selecting plates is a feeler arm 90 rotatably mounted on a shaft 91 located within the machine. A stud 92, mounted on a lower portion of the feeler arm 90, is positioned within a yoke portion of an idler arm 93 rotatably mounted on a shaft 94. A stud 95, mounted on the arm 93, is held in engagement with one end of a feeler cam arm 96 by a spring 97 mounted between the idler arm 93 and the cam arm 96. The cam arm 96 is rotatably mounted on the shaft 25 and is normally urged counter-clockwise about the shaft 25 by a spring 98 mounted between the arm and a shaft (not shown) located in the machine framework.

Associated with the cam arm 96 is a cam 100, secured to the main cam drive shaft 20. Mounted on the cam are a roll 101 and a drive plate 102. Upon the clockwise rotation of the cam 100 by the main cam drive shaft 20, the roll 101 and the drive plate 102 engage the cam arm 96 and rock it clockwise against the action of the spring 98. This movement of the cam arm is transmitted by the spring 97 to the idler arm 93, thereby rocking the arm counter-clockwise, which results in the clockwise rotation of the feeler arm 90.

Rotatably mounted on the tip of the feeler arm 90 is a double-end sensing finger 103 having a bent-over ear 104 at each end. As shown in FIGURE 6, each of the selecting plates 85, 87, and 88 contains a number of cut-out portions 105 located along the peripheral edge. Depending on the programming of the machine operation, a cut-out portion corresponding to a transaction key is or is not positioned adjacent one of the ears 104 when the selecting plate is positioned commensurate with the actuation of that transaction key in the manner described previously.

If a cut-out portion is positioned adjacent one of the ears 104, the feeler arm 90 is able to move clockwise a sufficient distance to position a stud 106, located on its opposite end, in a blocking position with respect to a non-repeat pawl 107 rotatably mounted on a release slide 108 in the transaction bank, the function of which will be described hereinafter. As fully disclosed in the Goodbar et al. United States patent cited previously, mounted adjacent each of the transaction keys are a number of detents or slides, which are selectively moved when certain transaction keys are depressed. One of these slides (not shown) controls the operation of the key lock line 110, which, when rocked counter-clockwise, releases the machine for operation.

As shown in FIGURE 6, the key lock line 110 has pinned thereto an arm 111 having a bent-over flange 112, which extends in front of the non-repeat pawl 107 and a stop portion 113 of the release slide 108. Normally, the stop portion 113 of the release slide prevents the key lock line 110 from being rocked counter-clockwise by engaging the flange 112 of the arm 111. When a transaction key is depressed, the release slide 108 is moved to the left. This action also carries the non-repeat pawl to the left, resulting in clockwise rocking of the pawl against the action of a spring 114 mounted between a finger portion 115 of the pawl and the release slide, due to the engagement of the top portion 116 of the pawl with the flange 112 of the arm 111.

Movement of the release slide 108 to the left allows the key lock line 110 to be rocked counter-clockwise, thereby initiating a machine operation. Subsequently thereto, the key lock line 110 and the arm 111 are rocked clockwise to their home positions, at which time the top portion 116 of the non-repeat pawl latches the flange 112 of the arm 111, due to the action of the spring 114. This prevents the key lock line 110 from being rocked to initiate a new machine operation while the release slide is in an actuated position. Normally, at the end of a machine operation, the release slide is moved to the right to its home position, thus blocking the movement of the arm 111. This movement carries the non-repeat pawl 107 to the right, thereby unlatching the flange 112 of the arm 111.

In the present example, with the release slide 108 and the non-repeat pawl 107 moved to their leftmost positions, as viewed in FIGURE 6, the sensing of a cut-out portion in the selecting plate 85 allows the feeler arm 90 to move clockwise, thereby positioning the stud 106 behind a lower portion 109 of the non-repeat pawl 107 and the release slide 108, thus blocking any latching movement of the pawl and the return movement of the slide to its home position. Thus the key lock line 110 is conditioned for a continuous machine operation.

Figure 7:
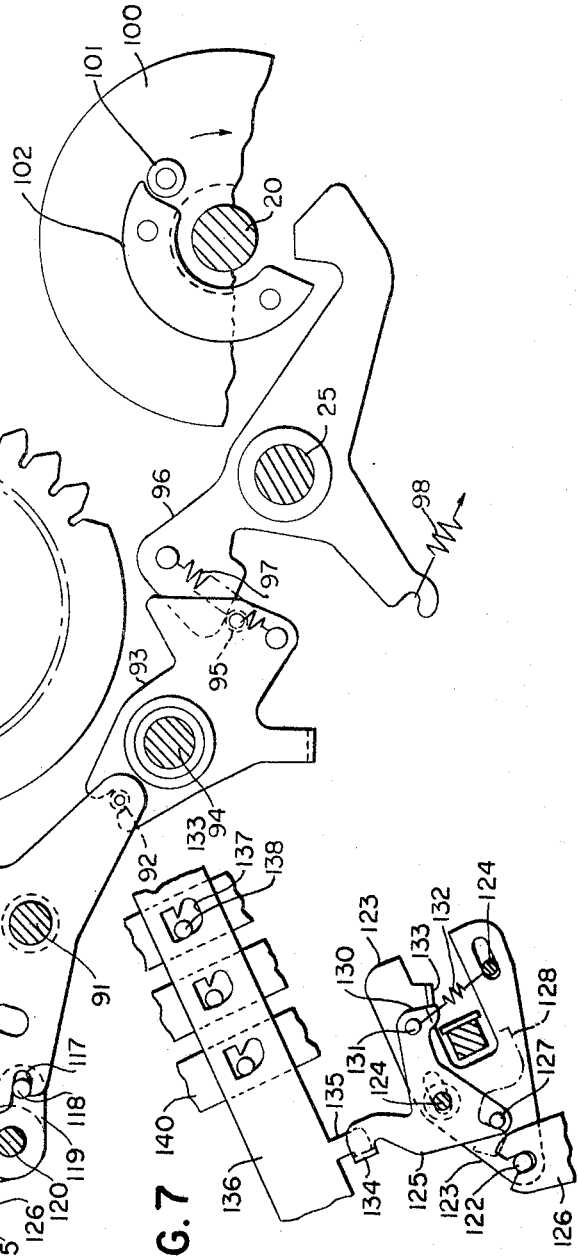
FIGURE 7 is a partial detailed side view of the transaction detent mechanism for controlling the operation of the key lock line.

The lower portion of the feeler arm 90 has a slot 117, which yokes over a stud 118 mounted on an arm 119. The arm 119 is pinned to a shaft 120, to which is pinned a second arm 126 having a slot portion 121, which yokes over a stud 122 mounted on a slide 123, which in turn is mounted for a rectilinear movement on a pair of studs 124. The studs 124 are mounted within the machine framework. As shown in FIGURE 7, rotatably mounted on the upper stud 124 is an arm 125 having a stud 127, which normally engages a frame member 128, a portion of which is shown in phantom lines. The arm 125 has a rear portion 130, on which is mounted a stud 131, to which is attached a spring 132, the other end of which is connected to the lower stud 124. The spring 132 normally biases the arm clockwise to move the stud 127 into engagement with the frame member 128 while the portion 130 is positioned in the path of a flange 133 of the slide 123.

The arm 125 has an upper flange 134, which is normally positioned in the path of a lug 135 located on the bottom of a transaction detent or slide 136. As shown in FIGURE 7, the detent 136 contains a number of cam slots 137, in which is located a stud 138 mounted on the stem 140 of an associated transaction key. Whenever one of the keys 140 is depressed, the stud 138 engages a cam surface of the slot 137, thereby camming the detent to the left, as viewed in FIGURE 7. This action is transmitted by the lug 135 to the arm 125, rocking the arm counter-clockwise, thereby removing the rear portion 130 of the arm from a blocking position with the flange 133 of the slide 123. This action frees the slide 123 for movement to the left, as viewed in FIGURES 6 and 7. This construction functions as an interlock for controlling the operation of the feeler arm 90. Unless one of the transaction keys 140 is depressed, the slide 123, through the connection of the arms 126, 119, will prevent the clockwise rotation of the feeler arm 90 during a sensing operation. Thus, with the counter-clockwise rotation of the arm 125, the machine will be conditioned for an automatic cycle operation in a manner which will now be described.

Referring now to FIGURE 8, there is shown the mechanism for automatically setting the primary transaction rack members of each transaction bank to a pre-programmed key-representing position, thereby controlling the machine for an automatic operation. As described previously with respect to FIGURE 6, the selecting plates 85, 87, and 88 are positioned under the control of the transaction key through the operation of the transaction segment 74 (FIGURE 4) and the square shaft 81. Also set to a position representing the transaction key that is depressed in each of the transaction rows of keys is a second selecting plate 141 (FIGURE 8), rotatably mounted on the shaft 86. The selecting plate 141 of each transaction row is positioned by the action of the square shaft 31 and pinions 142 in the same manner as that of the shaft 81 and the pinion 83 (FIGURE 6).

The edge of the selecting plate 141 contains a number of control surfaces 143 of varying depths, each surface position representing a transaction key. Rotatably mounted on the shaft 86 adjacent to the selecting plate 141 is a drive segment 144. Located on its edge are a number of gear teeth 145, which are engaged by a cam follower arm 146 rotatably mounted on the shaft 25. The cam follower arm 146 has mounted thereon a roll 147, which is normally urged into engagement with a cam 148 by a spring 150 secured between the cam follower arm 146 and a portion of the machine.

The drive segment 144 also contains a cam surface 151, which cooperates with a stud 152 mounted on a selecting plate feeler 153. The plate feeler 153 is rotatably mounted on a stud 154 (FIGURES 8 and 9), which in turn is mounted between a pair of support frames 155, 156 (FIGURES 8 and 9). The support frame 155 is broken away in FIGURE 8 to show details of the plate feeler 153. Each of the support frames 155, 156 is mounted on a pair of guide bars 157, 158, mounted within the machine framework.

Also rotatably mounted on the stud 154 is a stop-positioning segment 160 (FIGURE 8). Mounted on a stud 159 located in the support frame 156 adjacent to the segment 160 is an automatic rack stop member 161 (FIGURE 9). The segment 160 has a stud 162, which is positioned within a slot 163 located in the rack stop 161. A spring 164 (FIGURE 8) is connected between a stud 165, mounted on the plate feeler 153, and a stud 166, mounted on the segment 160, for coupling the segment to the feeler in a manner to be described more fully hereinafter. A second spring 167, mounted between the stud 165 and a stud 168, located on the support frame 155, normally biases the feeler 153 clockwise about the stud 154.

The front portion of the stop-positioning segment 160 contains a number of gear teeth 170, which engage the teeth of an index segment 171 rotatably mounted on a stud 169, which in turn is mounted on the support frame 155. The rear portion of the segment 171 contains a number of teeth 172, which connect with the tooth portion 173 of a retaining pawl 174 rigidly mounted on a slide 175.

The slide 175 is supported by a number of studs 176, 177, and 178. The stud 176 is mounted on the slide 175 and is positioned within a slot 180 in the support frame 155. The other studs, 177 and 178, are mounted on the support frame 155 and are positioned within slots 181 in the slide. A spring 182 is mounted between the stud 178 and a stud 183, mounted on the slide 175, for normally urging the slide to the right, as viewed in FIGURE 8.

Rotatably mounted on the stud 169 is a slide drive arm 184, on which is mounted a stud 185 located at the top of the arm. This stud is positioned within a cut-out portion 186 located in the edge of the slide 175. Under the action of the spring 182, the drive arm 184 is normally urged for clockwise movement about the stud 169 by the movement of the slide 175. This clockwise movement is limited by a stud 187 mounted on the drive segment 144.

In the operation of the automatic cycle control mechanism, the initial depression of a programmed transaction key results in the setting of the selecting plate 85 (FIGURE 6) and the selecting plate 141 (FIGURE 8) through the operation of the square shaft 81 in the manner described previously. If this is to be an automatic cycle operation, a cut-out portion 105 (FIGURE 6) of the selecting plate 85 is so positioned as to allow the feeler arm 90 to move clockwise, so as to position the stud 106 to the right of the non-repeat pawl 107, thereby blocking the return movement of the pawl and the release slide to their home positions, as described previously. This frees the key lock line 110 to operate for a number of consecutive machine operations.

Prior to these operations, the detent 136 (FIGURE 7) will have been moved to the left, as viewed in FIGURE 7, by the depression of the transaction key, thus rocking the arm 125 counter-clockwise. This rotation removes the rear portion 130 of the arm from interference with the flange 133 of the slide 123, thereby allowing the feeler arm 90 to move to a sensing position with respect to the selecting plates 85.

After the selecting plates 141 (FIGURE 8) have been set commensurate with the transaction keys that have been depressed in the transaction banks, the cam 148 (FIGURE 8) rocks the cam follower arm 146 counter-clockwise, which movement is transmitted to the drive segment 144, thereby rocking the segment clockwise. This clockwise movement of the segment 144 results in the clockwise rocking of the sensing plate feeler, due to the stud 152 moving along the cam surface 151 under the action of the spring 167. The feeler 153 senses one of the control surfaces 143 that has been positioned adjacent to the feeler by the depression of the transaction key. The control surfaces 143 are shown to be at various depths, each representing a transaction key that may be programmed to be operated during the next machine operation. Thus the amount of movement of the feeler 153 in sensing the control surfaces 143 represents the transaction key of the next operation. This movement is transmitted to the stop-positioning segment 160 (FIGURE 9) by a lower front flange portion 191 of the feeler 153, which extends through an opening 192 in the segment 160 and engages the segment under the action of the spring 164. Thus the feeler 153 rocks the segment 160 about the stud 154 a distance commensurate with the control surface 143 that is sensed by the feeler. As described previously, the stud 162, mounted on the segment 160, is positioned within the slot 163, located in the rack stop 161. It is seen that, through this construction, the movement of the segment 160 by a sensing operation of the feeler 153 is transmitted to the rack stop 161, thereby positioning the rack stop commensurate with the control surface 143 sensed by the feeler.

As shown in FIGURE 9, the rack stop 161 has a number of stop surfaces 193, each corresponding to a transaction key. The positioning of the rack stop 161 positions a stop surface 193, corresponding to the control surface 143 sensed by the feeler 153, in the path of a flange member 194 (FIGURE 9) extending from the bottom of the primary rack member 43 of the associated transaction bank. Thus, during the next machine operation, the primary rack member 43 is positioned commensurate with the control surface sensed by the feeler 153. During this second machine operation, the selecting plates 85 (FIGURE 6) and 141 (FIGURE 8) are again positioned to control the movement of the feelers 90 and 153, thereby allowing the machine to operate and control the rack stop 161 to position the primary rack member 43 in a predetermined key position during a succeeding machine operation. Thus the position and the type of cut-out portions 105 and control surfaces 143 that are programmed in the selecting plates 85 and 141 will determine the number of operations that the machine will cycle consecutively and the type of operation that will occur.

As shown in FIGURE 8 and as disclosed previously, the front of the stop-positioning segment 160 consists of a number of gear teeth 170, which engage an index segment 171, which in turn is normally engaged by the retaining pawl 174 mounted on the slide 175. Upon the clockwise rotation of the drive segment 144, the stud 187, mounted on the segment, allows the slide drive arm 184 to rock counter-clockwise under the action of the spring 182, resulting in the movement of the slide 175 and the retaining pawl 174 to the right, as viewed in FIGURE 8. This action removes the pawl from engagement with the index segment 171, thereby freeing the index segment for movement by the stop-positioning segment 160. Upon the sensing of a control surface by the feeler 153 in the manner described above, the index segment 171 is rotated by the stop-positioning segment 160 commensurate with the rotation of the feeler 153.

As the cam 148 (FIGURE 8) completes its rotation, the cam follower arm 146 is rocked clockwise, thereby rocking the drive segment 144 counter-clockwise. This allows the stud 187 to rock the drive arm 184 counter-clockwise, which action returns the slide 175 and the retaining pawl 174 to the left, which allows the retaining pawl to engage the index segment 171 and lock it in its adjusted position. This movement also locks the segment 160 and the rack stop 161 in their adjusted positions.

The counter-clockwise movement of the drive segment 144 allows the cam surface 151 to rock the feeler 153 counter-clockwise about the stud 154 against the action of the springs 164 and 167. This removes the feeler from engagement with the control surfaces 143 of the selecting plates 141, thereby allowing the selecting plates to be adjusted to a new position under the control of the rack stop 161 and the primary rack member 43 of the transaction bank. Thus the mechanism is positioned for the next machine operation.

Referring now to FIGURES 10 and 11, there is shown a mechanism for controlling the operation of the main cam shaft 20. As fully disclosed in the previously cited United States patent application Ser. No. 601,147, filed Dec. 12, 1966, by Dale L. Placke and Kenneth C. Flint, the cam shaft is controlled by transaction keys on the keyboard to operate through a short or long cycle of operation. When the depression of an amount key is part of the machine operation, the cam shaft operates for a short cycle, or 390 degrees of revolution. When the depression of an amount key is not part of the machine operation, as in a total-taking operation or a read operation, the cam shaft 20 is located 510 degrees for a long cycle operation. In the present example, whenever there is an automatic cycle operation, the cam shaft 20 is operated through 510 degrees of revolution. In order to allow an amount key operation to precede an automatic cycle operation, the machine cycle control mechanism must be shifted from a short cycle operation to a long cycle operation automatically. This is accomplished by the mechanism disclosed in FIGURES 10 and 11.

As fully disclosed in the previously cited United States patent application Ser. No. 601,147, filed Dec. 12, 1966, a clutch trip selection stud 195 (FIGURE 10), corresponding to the stud 74 in the said United States patent application, controls the operation of the machine for either a short or a long cycle operation. As shown in FIGURE 10, the stud 195 is located in a short cycle position. This occurs when an amount key has been depressed. When a long cycle operation is to occur, the stud 195 is shifted to the position shown in dotted lines.

The stud 195 is mounted on a selecting arm 196, which in turn is rotatably mounted on a link member 197 rotatably mounted on a side frame (not shown) of the machine. A stud 198, mounted on the arm 196, is positioned within a slot 200 located in a control link 201 and is also positioned within a slot 202 of a second link member 203. The link member 203 is rotatably mounted on one end of a lever 204, which in turn is rotatably mounted on a shaft 205. A spring 206, mounted between a stud 207, located on the lever 204, and a shaft 208 of the machine, normally urges the lever clockwise until it engages the shaft 208, as shown in FIGURE 10.

The other end of the lever 204 contains a stud 210 located adjacent a drive arm 211 having a hooked end portion 212. The drive arm 211 is rotatably mounted on a shaft 213. The other end of the arm 211 contains a number of gear teeth 214, which engage gear teeth located at one end of an actuating arm 215 rotatably mounted on the shaft 25. The other end 216 of the arm 215 is positioned adjacent a flanged extension 217 of the idler arm 93, which extends in the same plane as the end 216 of the arm 215.

Also rotatably mounted on the shaft 25 adjacent to the arm 215 is a cam follower 218, on which is mounted a stud 220 extending over the end 216 of the arm 215. During each machine operation, the cam follower 218 is rocked counter-clockwise by a cam (not shown) similar to the cam 21 (FIGURE 1). This movement rocks the actuating arm 215 counter-clockwise due to the action of the stud 220 on the end 216 of the arm 215. The rocking of the arm 215 is transmitted to the drive arm 211 and the lever 204 through the engagement of the stud 210 by the hooked end portion 212 of the arm 211, thereby resulting in counter-clockwise rotation of the lever 204. The rotation of the lever 204 rocks the selecting arm 196 counter-clockwise against the action of the spring 206, which positions the stud 195 in the long cycle position, as shown in dotted lines in FIGURE 10. If an amount key has not been depressed at this time, the stud 195 would have normally been in the long cycle position, as will be explained more fully hereinafter. The elongation of the slot 202 in the link 203 allows the stud 195 to be in a long cycle position prior to the rocking of the lever 204 by the cam follower 218. As will be described more fully hereinafter, the positioning of the stud 195 is also controlled by the link 201, which in turn is positioned according to whether an amount key has been depressed or not.

If at this time an automatic cycle operation had been programmed for initiation, the idler arm 93 will have been rocked counter-clockwise, as disclosed previously. This movement positions the flange extension 217 of the idler arm 93 above the end 216 of the actuating arm 215, thus blocking any return movement of the arm to the position shown in FIGURE 10. Thus the stud 195 is located in the long cycle position and is held there as long as the idler arm is held in this actuated position. If the idler arm 93 is not rocked counter-clockwise, the link 203 is returned to its lower position at the end of the machine operation under the action of the spring 206 when the cam follower 218 is rocked clockwise by its control cam.

In order to insure that an amount key will not be depressed when the machine is scheduled for a long cycle operation, an interlock mechanism is included to disable the machine from operation as long as an amount key is depressed. The mechanism shown in FIGURE 10 illustrates the condition of an amount key in a depressed condition. As shown, the stud 195 is in a short cycle position. The system will now be described with relation to a machine operation in which a long cycle operation is programmed but with an amount key being held in a depressed position by the operator.

With reference to FIGURE 10, the rocking of the selecting arm 196 in a counter-clockwise direction to position the stud 195 in a long cycle position, as described above, also raises the link 201 (FIGURE 10) against the action of a spring 221, secured between a stud 222, mounted on a control arm 223, and a frame member (not shown). The link 201 is rotatably mounted on the stud 222. This movement of the link 201 rocks the control arm 223 counter-clockwise about a shaft 224.

Mounted on the arm 223 are a pair of studs 225, 226, to which are attached one end of springs 227, 228, respectively. The other end of the spring 228 is attached to a stud 230 mounted on an arm 231, which in turn is rotatably mounted on the shaft 224, while the spring 227 is attached to a stud 232 mounted on an arm 233 rotatably mounted on a shaft 234. The ends of the arm 223 and 231 form a scissors arrangement with a stud 235, mounted on a cycle control arm 236, and a stud 237, mounted on the arm 233. The spring 228 in this arrangement provides an elastic link connection between the cycle control arm 236 and the control arm 223. The stud 237 acts as a connecting point between the arm 233 and the arm 223. As will be explained more fully hereinafter, the cycle control arm 236 is held in the position shown in FIGURE 10 by a depressed amount key. Under this condition, when the control arm 223 is rocked counter-clockwise by the action of the cam follower 218 in the manner described previously, the spring 228 would tend to rotate the arm 231 in the same direction, but the arm at this time is held by the stud 235. Under normal conditions, with no amount key depressed, the arm 236 would be rocked clockwise.

The arm 233 is connected to a disabling arm 240 by means of an adjustment stud 241 mounted on the arm 233 and positioned within a slot 242 located in the arm 240. The disabling arm 240 and the arm 233 are rotatably mounted on the shaft 234, and, when the arm 233 is rocked counter-clockwise by the spring 227, an end portion 243 of the arm 240 will be positioned in the path of a stud 244 located on a release arm 245 rotatably mounted on a shaft 246. The release arm 245 is connected to the key lock line 110 (FIGURE 6) by a link member (not shown). As previously described, the key lock line 110 must be rocked counter-clockwise in order to release the machine for operation. This movement is transmitted to the release arm 245 where the release arm is rocked counter-clockwise to normally position the stud 244 above the end 243 of the arm 240, thereby blocking any counter-clockwise movement of the arms 240 and 233. Only when the key lock line 110 (FIGURE 6) and the release arm 245 are in their home positions is the arm 240 allowed to move counter-clockwise. Thus it is seen that, if the end portion 243 of the disabling arm 240 blocks the movement of the release arm 245, the key lock line 110 and the machine will be prevented from operating during an automatic cycle operation.

As shown in FIGURE 10, the top portion of the cycle control arm 236 contains a slot 247, within which is positioned a detent connecting bar 248, which, as shown in FIGURE 11, is rotatably mounted on its top portion 250. The connecting bar extends the length of the amount key bank and is positioned within a slot 251 located in a control detent 252, which in turn is located in each amount bank. The connecting bar 248 is shown in FIGURES 10 and 11 in a short cycle position, which is the normal position prior to a machine operation. The dotted position of the bar shown in FIGURES 10 and 11 is a long cycle position. Whenever a transaction key is depressed, which operates the machine, requiring a long cycle operation, the connecting bar 248 is rocked clockwise to its dotted position. This also occurs when the lever 204 is rocked counter-clockwise during an automatic cycle operation, described previously. When an amount key 253 (FIGURE 10) has been depressed to initiate a machine operation, a stud 254, mounted on the amount key 253, cams the detent 252 to the left, as shown in FIGURE 11, by engaging a cam slot 255 in the detent. This movement of the detent 252 locks the connecting bar 248 in the short cycle position, as shown in FIGURES 10 and 11, thereby locking the cycle control arm 236 in the position shown in FIGURE 10 and the stud 195 in the lower, or short cycle, position. Normally, at the end of an amount key operation, all of the amount keys are released, and the detents 252, under the action of a spring 257, are returned to their home position, or to the right, as viewed in FIGURE 11. As shown in FIGURE 11, this movement of the detent 252 positions the slot 251 so that, upon the subsequent depression of a transaction key to initiate a long cycle operation of the machine, the connecting bar 248 is free to be rocked counter-clockwise to a long cycle position. If an automatic cycle operation had been programmed for operation at this time, this counter-clockwise movement of the bar 248 would occur under the control of the cam follower 218, the arm 223, and the arm 236, as explained above.

As disclosed above, when an automatic cycle operation is initiated and an amount key is being held in an actuated, or depressed, condition, the release arm 245 is prevented from moving counter-clockwise due to the locked position of the arm 236, thereby preventing the release of the machine. This condition signals the operator to depress a release key on the keyboard, which restores all depressed amount keys. This action results in the cycle control arm 236 being rocked clockwise by the springs 227 and 228 through the scissors action of the arms 223 and 231 on the stud 235. The further clockwise movement of the arm 240 removes its end portion 243 from a blocking position with respect to the stud 244 on the release arm 245. Therefore the machine will be released for operation to initiate an autocycle or long cycle operation. It will thus be seen from this structure that an autocycle operation of the machine can be initiated automatically following an amount key entry operation.

While the form of mechanism shown and described herein is admirably suited to fulfill the objects primarily stated, it is to be understood that it is not intended to confine the invention to the form or embodiment disclosed herein, for it is susceptible of embodiment in various other forms, all coming within the scope and spirit of the invention.

What is claimed is:

1. In a business machine capable of being operated through a plurality of machine operations,
    (a) a plurality of differentially settable members each having a control surface mounted thereon;
    (b) a plurality of selectively operated control keys for controlling the extent of movement of the settable members during each machine operation when actuated;
    (c) a plurality of differentially settable control members having a number of control surfaces each representing one of said control keys, said control members positioned according to the movement of an associated settable member to position one of the control surfaces in a sensing position;
    (d) a blocking member mounted adjacent the control surface of each of said differentially settable members, said blocking member having a plurality of blocking surfaces each representing one of said control keys and adapted for movement to position one of said blocking surfaces in the path of the control surface to position the settable member commensurate with the control key representing the blocking surface;
    (e) movable sensing means mounted adjacent said control members and connected to said blocking member;
    (f) and actuating means connected to said sensing means to actuate said sensing means to sense the positioned control surface on said control member whereby said blocking member is moved to position a blocking surface in a blocking position with respect to the control surface of the settable member positioning the settable member commensurate with the control surface sensed.

2. The business machine of claim 1 in which said sensing means includes a
    (a) feeler member rotatably mounted adjacent said control member and having a stud mounted thereon;
    (b) positioning means supporting said blocking member and rotatably mounted adjacent said feeler member; and
    (c) resilient means interconnecting said feeler member and said positioning means to couple said positioning means to said feeler member whereby said positioning means will move with said feeler member to an adjusted position;
    (d) and said actuating means includes a cam rotatably mounted adjacent said feeler member and engaging said stud;
    (e) and means for actuating said cam member whereby the feeler member is rotated by said cam member in a sensing direction to sense a positioned control surface thereby positioning the blocking member commensurate with the control surface sensed.

3. The business machine of claim 2 in which said positioning means includes
    (a) a plurality of locking surfaces;
    (b) a retaining pawl mounted adjacent said positioning means and normally engaging said locking surfaces, thereby disabling the movement of said positioning means;
    (c) a slide member supporting said retaining pawl and movable to an operated position, thereby disengaging said retaining pawl from said locking surface;
    (d) and an actuating member engaging said slide member and operated by said cam member to move said slide member to an operated position, thereby releasing the positioning means for movement to an adjusted position.

4. The business machine of claim 1 in which said settable member comprises a rack member mounted for movement;
    said control surface comprises a flange member mounted on the rack member and extending outwardly therefrom;
    and said blocking member comprises a lever member having a plurality of stepped cut-out portions located along its peripheral edge, said lever member being rotatably mounted in the plane of said flange member whereby upon rotation by said sensing means, one of said cut-out portions is positioned to engage said flange member, thereby positioning the rack member commensurate with the control surfaces sensed.

5. In a business machine capable of being operated through a plurality of machine operations,
    (a) means when actuated for initiating a single machine operation;
    (b) control means when operated for controlling said initiating means to cycle said machine for a plurality of machine operations;
    (c) a plurality of differentially settable rack members each having a control surface mounted thereon;
    (d) a plurality of selectively operated control keys for controlling the extent of movement of the rack members during each machine operation when actuated;
    (e) a plurality of first differentially settable control members having a number of first control surfaces each representing one of said control keys, said control members positioned according to the movement of an associated rack member to position one of the first control surfaces in a sensing position;
    (f) a plurality of second differentially settable control members having a number of second control surfaces each representing one of said control keys, said second control members positioned according to the movement of an associated rack member to position one of the second control surfaces in a sensing position;
    (g) a blocking member mounted adjacent the control surfaces of each of said rack members, said blocking member having a plurality of blocking surfaces each representing one of said control keys and adapted for movement to position one of said blocking surfaces in the path of the control surface to position the settable member commensurate with the control key representing blocking surface;
    (h) a first movable sensing means mounted adjacent said first control members and connected to said blocking member;
    (i) a second movable sensing means mounted adjacent said second control members and connected to said control means;
    (j) and actuating means connected to said first and second sensing means to actuate said sensing means to sense the positioned control surfaces on said first and second control members whereby said control means is operated to condition the business machine for a plurality of machine operations and said blocking member is moved to position a blocking surface with respect to the control surface of the rack member, positioning the rack member commensurate with the control surface sensed.

6. The business machine of claim 5 in which said initiating means includes
   (a) a control arm for operating the machine through a cycle of operation when actuated;
   (b) means for actuating said control arm including a slide member mounted for movement between a first position normally engaging said control arm, thereby disabling the arm from actuation, and a second position, releasing said arm for actuation, said slide member being moved to said second position upon actuation of any of said control keys;
   (c) and blocking means mounted on said second sensing means and positioned adjacent said slide member whereby, upon sensing of a second control surface by said second sensing means during a machine operation, the blocking means is positioned by the second sensing means to block the slide member from moving to the first position.

7. The business machine of claim 6 in which said second sensing means includes a lever member, and
   sensing fingers mounted on one end of said lever for sensing the second control surfaces;
   and said blocking means comprises a stud member mounted on the other end of said lever member whereby, upon sensing of a second control surface by said sensing fingers, the lever member is moved to position the stud member in the return path of the slide member to the first position, thereby allowing said control arm to be actuated.

8. The business machine of claim 5 which includes
   (a) an arm member rotatably mounted adjacent said second sensing means;
   (b) first means mounted on said arm member engaging said second sensing means for rotating said arm member upon movement of the sensing means in a sensing direction;
   (c) and second means engaging said arm member for controlling the movement of said arm member, said second means being operated by a predetermined number of the control keys for releasing the arm member for movement whereby said second sensing means is operated by said actuating means.

9. The business machine of claim 8 in which said second means includes
   (a) a slide member engaging said arm member;
   (b) means supporting said slide member for movement upon the rotation of said arm member;
   (c) a stop member located on said slide member;
   (d) a release member rotatably mounted adjacent said slide member, said release member having a blocking portion positioned adjacent said stop member;
   (e) resilient means engaging said release member for normally positioning the blocking portion of the release member in the path of the stop member, thereby disabling the movement of the slide member;
   (f) a control detent slidably mounted adjacent said control keys and engaging a portion of the release member;
   (g) and means mounted on certain of said control keys engaging said control detent to move said detent when said control keys are depressed whereby said release member is rotated to release the slide member for movement, thereby allowing said second sensing means to be operated by said actuating means.

10. The business machine of claim 7 which includes
    (a) a cycle control member movable between a first position and a second position to control the machine through a short and long machine operation
    (b) cam means operated during each machine operation;
    (c) first means connected to said cycle control member and operated by said cam member to position the cycle control member in the second position;
    (d) and means operated by said lever member when sensing a second control surface to engage said operated first connected means whereby said cycle control member is held in said second position.

11. The business machine of claim 10 in which said first connected means includes a yoke member having an extended end portion, said end portion being moved to an actuated position upon the positioning of the cycle control member in the second position by said cam member; and said engaging means comprises an arm member rotatably mounted adjacent the yoke member and engaging said lever member, said arm member having a flange portion positioned adjacent said extended arm portion of the yoke member whereby, upon rotation of said lever member in sensing a second control surface, the arm member is rotated to position the flange portion in the return path of said extended arm portion, thereby holding said cycle control member in said second position.

12. The business machine of claim 11 which includes
    (a) second means connected to said cycle control member to move said control member to said second position when operated;
    (b) a plurality of amount key members;
    (c) detent means engaging said amount key members;
    (d) means slidably supporting said detent means for movement to a first position upon operation of any of said amount key members;
    (e) and means interconnecting said second connected means and said detent means to disable the operation of the second means when the detent means is in said second position, whereby said cycle control member is held in said first position upon operation of any of said amount key members.

References Cited

UNITED STATES PATENTS

| | | | |
|---|---|---|---|
| 2,821,341 | 1/1958 | Barnhardt | 235—60 |
| 3,015,434 | 1/1962 | Slamb et al. | 235—11 |
| 3,302,875 | 2/1967 | Kollmann et al. | 235—60 |
| 3,315,884 | 4/1967 | Bennett | 235—60 |
| 3,335,947 | 8/1967 | Edwards et al. | 235—60 |

STEPHEN J. TOMSKY, Primary Examiner

U.S. Cl. X.R.

235—62